United States Patent Office

3,792,070
Patented Feb. 12, 1974

3,792,070
BASIC ALUMINUM BROMIDE-POLYOL COMPLEXES AND METHODS OF MAKING SAME
John L. Jones, North Plainfield, and Andrew M. Rubino, New Providence, N.J., assignors to Armour Pharmaceutical Company, Chicago, Ill.
No Drawing. Continuation-in-part of abandoned application Ser. No. 88,206, Nov. 9, 1970. This application June 24, 1971, Ser. No. 156,476
Int. Cl. C07f 5/06
U.S. Cl. 260—448 R                    8 Claims

ABSTRACT OF THE DISCLOSURE

Complexes of basic aluminum bromides containing polyhydroxy compounds (polyols) are prepared by heating an aqueous solution of basic aluminum bromide under reflux conditions, mixing the solution with a polyhydroxy compound having at least two carbon atoms which are linked to hydroxy groups, and drying the resulting mixture to a substantially friable solid, preferably by spray drying. The resulting complexes preferably contain about 5 to 20 weight percent of polyol and less than about 17 weight percent water. Such complexes have a high degree of solubility in anhydrous alcohol and an unexpectedly high compatibility with halogenated hydrocarbons. These properties make the complexes suitable for aerosol formulations and particularly antiperspirant compositions.

---

The present invention relates to basic aluminum bromide-polyol complexes and methods of making such complexes. More particularly, the invention is directed to complexes of 5/6 basic aluminum bromides and polyhydroxy compounds, which are particularly suitable for use in antiperspirant composition.

This application is a continuation-in-part of our co-pending application Ser. No. 88,206, filed Nov. 9, 1970, for "Basic Aluminum Bromide Composition," and assigned to the same assignees as the present invention.

It has been known in the art for some time that aluminum compounds are among the most useful active ingredients in astringent or antiperspirant compositions and other cosmetic products. Of particular interest in this regard are the basic aluminum halides. In order to be an effective astringent, as well as being safe and commercially acceptable in antiperspirant composition, it is believed necessary that the aluminum compound meet the following requirements:

(1) The aluminum compound must retain its ionic character in order to be effective when incorporated into an antiperspirant composition;

(2) In order to substantially avoid corrosion of skin and clothing, the product should have a pH (in water) which is at least about 3.0, while at the same time containing a sufficient amount of aluminum in ionic form to be effective as an antiperspirant;

(3) The composition should contain a minimal amount of water so as to avoid corrosion of metal valves and containers for the product, and thereby eliminate product contamination resulting from the corrosion;

(4) For use in aerosol antiperspirant sprays the aluminum compound must be compatible with the halogenated hydrocarbons which are employed as aerosol propellants; and (5) The active ingredient must be capable of being dissolved in non-aqueous media (e.g., anhydrous alcohol) in concentrations of at least 10 percent by weight (5 percent by weight in aerosol formulation, which generally contain about 40 to 60 percent volatile propellants).

The above and other requirements have been met in varying degrees by a number of recently developed aluminum compounds. Examples of such compounds are described in U.S. Pat. No. 3,359,169 for "Aluminum Compounds" issued to Joseph N. Slater; U.S. Pat. No. 3,420,-932 for "Methods of Making Alcohol Soluble Complexes of Aluminum and Preparations Employing the Complexes" issued to the present applicant and assigned to the same assignee as the present invention; and our above mentioned co-pending application for "Basic Aluminum Bromide Compositions." Nevertheless, attempts are still being made to produce even better astringent aluminum compounds.

It is an object of the present invention to provide an aluminum compound having a high degree of solubility in anhydrous alcohol and excellent compatibility with conventional aerosol propellants.

It is a further object of the present invention to provide an improved basic aluminum bromide composition having low water content and good antiperspirant properties.

It is a still further object of the present invention to provide improved basic aluminum bromide-polyol complexes having low polyol contents and improved antiperspirant formulation characteristics.

It is another object of the present invention to provide a method for preparing improved basic aluminum bromide-polyol complexes.

Still another object of the present invention is the provision of high compatibility aluminum compounds which allow for higher concentration usage in aerosol antiperspirant compositions.

Still further objects will appear hereinafter.

The above and other objects are achieved by the basic aluminum bromide-polyol complexes of the present invention made by a method which comprises providing an aqeuous solution of basic aluminum bromide; heating the aqueous solution under reflux conditions; mixing the aqueous solution with a polyhydroxy compound, having at least two carbon atoms and at least two of the carbon atoms being linked to hydroxy groups; and drying the resulting mixture to produce the complex in the form of a substantially friable solid.

Basic aluminum bromide complexes containing about 5 to 20 weight percent of the polyhydroxy compound and formed by the above method have halohydrocarbon compatibilities of greater than 190 cc. of $CCl_4$ to cause a permanent cloudiness in 60 grams of a 30 weight percent solution of the complex in anhydrous (SDA–40) alcohol. Such complexes may be satisfactorily employed in concentrations of 5 weight percent or more in aerosol antiperspirant formulations which include a non-toxic dermatologically acceptable non-aqueous solvent and an aerosol propellant.

Basic aluminum bromides per se are old in the art. Moreover, complexes of basic aluminum halides (particularly chlorides) with polyhydroxy compounds are known from U.S. Pats. Nos. 3,359,169 and 3,420,932, mentioned above. However, the latter patent which covers basic aluminum bromide-polyol complexes only includes compositions containing down to a minimum of about 18% polyol.

It has now unexpectedly been found that basic aluminum bromide-polyol complexes produced by the method of the present invention and having substantially lower polyol contents (i.e., on the order of 5 to 20 weight percent polyol) are readily soluble in cosmetic solvents such as anhydrous ethanol and show greatly improved compatibility with commonly used fluorocarbon propellants. Such higher compatibilities permit the usage of higher concentrations of the active aluminum in antiperspirant compositions, and the lower polyol content will produce less product tackiness, which ordinarily must be overcome by adjustments in the aerosol antiperspirant formulations.

Basic aluminum bromide compounds suitable for use in the preparation of the complexes of the present invention include those described in our above-mentioned co-pending application Ser. No. 88,206. Such compounds comprise one or more units of the general formula:

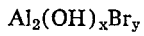

$$Al_2(OH)_xBr_y$$

wherein $x$ may vary from about 4.8 to 5.1 and $y$ may vary from 0.9 to 1.2 such that $x+y=6$. The approximately 5/6 basic aluminum bromides of the above formula have an aluminum to bromine mol ratio (hereinafter referred to as the Al/Br ratio) of about 1.7 to 2.2, and preferably about 1.85 to 2.05.

It should be understood that the above formula is greatly simplified and is intended to include simple hydrated salts, polymers and other complexes or mixtures, such that the basic formula would be an average consisting or whole and/or fractional units.

The basic aluminum bromides used in the present invention may be prepared in a manner analogous to the conventional production of aluminum chlorhydroxide by reacting aluminum metal with the hydrobromic acid in water solution, or by reacting aluminum metal with a water solution of aluminum bromide. In addition, they may be prepared by reacting elemental bromine with aluminum metal in a water medium. Such preparations are described in more detail in copending application Ser. No. 88,206.

The first step of the method of the present invention comprises the formation of an aqueous solution of a basic aluminum bromide. They may be conveniently achieved simply by using the filtered aqueous product obtained from any of the above-described preparations. The aluminum to bromide mole ratio may be suitably adjusted during any of these preparations. Alternatively, the aqueous basic aluminum bromide solution could be prepared from a solid basic aluminum bromide having the desired Al/Br mol ratio, since such solids are readily soluble in water.

The exact concentration of the aqueous basic aluminum bromide solution is not critical and may vary over a considerable range. However, too much water is uneconomical due to the necessity of removing the excess water during the drying step, and too little may hinder the preparation of the product due to increased viscosity. A suitable aqueous solution contains about 50 weight percent of the basic aluminum bromide.

Next, the aqueous basic aluminum bromide solution is heated under reflux conditions. The refluxing may be carried out in conventional equipment, and the reflux temperature may vary from very low values up to or above the boiling point of the liquid. However, from the standpoint of time and convenience it is desirable to maintain a reflux temperature at or near the boiling point of the solution. Thus, a satisfactory reflux temperature lies in the range of about 90 to 110° C., and preferably 100 to 105° C. Using a reflux temperature in the latter range, the solution should be refluxed for a minimum of about one hour, and preferably between about two and four hours. Refluxing beyond about four hours appears to have no beneficial effect.

After the refluxing is completed, the solution is preferably cooled to a temperature of about 50° C. or below.

At this point the polyhydroxy compound (polyol) is added to the aqueous solution. The polyhydroxy compounds used in the preparation of the complexes of the present invention are those containing at least two carbon atoms and two or more hydroxy groups linked to adjacent or non-adjacent carbon atoms. Such compounds include, but are not limited to, dihydric and polyhydric alcohols.

Examples of suitable polyhydroxy compounds for use in the present invention include: propylene glycol; 1,1,1-trimethylol propane; 1,3-butylene glycol (1,3-butanediol); glycerine (1,2,3-trihydroxy propane); 2-methyl-2,4-pentane-diol; neopentyl glycol (2,2-dimethyl-1,3-dihydroxy pentane); polyethylene glycol (mol. wt.=400); p-xylene-$\alpha,\alpha$ diol; and polyepichlorohydrin; butyne-1,4 diol; 2-ethyl-1,3-hexane-diol; and polypropylene glycol (av. mol. wt.=400). Particularly preferred polyhydroxy compounds are propylene glycol, 1,3-butanediol and trimethylolpropane (TMP).

The amount of polyhydroxy compound added to the aqueous solution will depend upon the particular polyhydroxy compound used and the final polyol concentration desired in the final product. Thus, for many of the polyhydroxy compounds allowance will have to be made for losses of polyol during the drying step. For other polyhydroxy compounds, such as trimethylolpropane, which are not volatile, the amount to be added will closely correspond to the final percentage in the solid product. The appropriate amount of polyhydroxy compound to be added for any particular polyhydroxy compound and any particular weight percent polyol desired in the final product may be readily determined by one of ordinary skill in the art with a minimum of routine experimentation.

It appears that almost any quantity of polyhydroxy compound added to the basic aluminum bromide solution can be beneficial. Thus, even small percentages give a product with solubility and compatibility properties superior to the bromide alone, as well as allowing for lower water contents. However, a range of about 5 to 20 weight percent polyol in the final solid complexes is preferred. Complexes having such percentages have carbon tetrachloride compatibilities range from about 190 to 400 or more cc's of $CCl_4$; that is such quantities may be admixed with 60 grams of a 30 weight percent solution of the complex in anhydrous (SDA-40) alcohol before a permanent cloudiness occurs. Such compatibilities are greatly superior to those of the basic aluminum halide-polyol complexes of U.S. Pat. No. 3,420,932, which compatibilities were on the order of about 150 to 175 ccs. of $CCl_4$.

Although applicants do not wish to be bound by any particular theory, it is believed that the structural bonding of the polyol compound to the basic aluminum bromide is analogous to one or more of those postulated in the aforementioned U.S. Pat. No. 3,420,932. Thus, the polyols may be bonded to the aluminum atoms in any of a number of chelate or coordination structures either with or without condensation of one or more hydroxy groups.

After addition of the polyhydroxy compound to the aqueous basic aluminum bromide solution, the resulting mixture is dried to yield a substantially friable solid form of the complex. While care must be taken not to overdry the product, the particular method of drying does not appear to be particularly critical. For example, products having good alcohol solubility and excellent fluorocarbon compatibility have been produced using either spray drying or rapid vacuum drying. Air drying or freeze drying may also be used, but spray drying is preferred as the most economical drying technique. Where rapid vacuum drying is employed, the drying temperature should be held to a maximum of about 40° C. The drying conditions for spray drying will vary greatly and depend to a large extent on the particular spray drying apparatus employed.

Although the particular quantity of water present in the final solid complex is not critical, lower water contents are preferred. Thus, complexes with very low water contents generally have higher compatibility with fluorocarbon propellants and have less potential for corrosion of metal valves and containers for the aerosol compositions. On the other hand, care must be exercised to prevent the product from becoming overdried to the point of alcohol insolubility. With these considerations in mind, a range of about 8 to 17 weight percent water based on the total weight of the solid and determined by Karl Fischer analysis is preferred.

A typical preferred solid product of the present invention will have an assay within the following approximate ranges:

17–21% aluminum
26–31% bromine
Al/Br mol ratio=1.7–2.2
5–20% polyol
8–17% water by Karl Fischer
4–14% water by calculation Throughout this application the weight percentages given for aluminum and bromine are determined by assays by accepted analytical procedures. Final concentrations of polyol in the complex solids are determined by calculation on the basis of a carbon assay in the case of volatile polyhydroxy compounds. In the case of non-volatile polyhydroxy compounds, the final weight percent of polyol is determined simply on the basis of the aluminum assay and the weight of polyhydroxy compound added to the aqueous solution. Since water contents determined by Karl Fischer titration are sometimes inconsistent, theoretical calculated water contents are also reported for most examples. The theoretical amount of free and coordinated water is calculated by solving the following equation for mols [OH]:

$$\text{mols [OH]} + \text{mols [Br]} = 3 \text{ [mols Al]}$$

and then subtracting the weight percents of OH, Br, Al and polyol from 100%.

The basic aluminum bromide-polyol complexes and the method of the present invention will now be described in more detail with reference to the following specific, non-limiting examples (all percentages being weight percents):

EXAMPLES I–VIII

A number of solutions were prepared in a manner similar to the reaction described in Example I of our copending application Ser. No. 88,206, except that the reaction was stopped prior to all of the aluminum being reacted so that a lower Al/Br ratio would be attained. These low ratio batches were combined and subjected to refluxing at about 100 to 105° C. for two hours. After cooling, the combined solution was assayed with the following results: 11.3% aluminum, 17.5% bromine, and Al/Br ratio=1.9.

The combined solution was then divided into 500 gram aliquots and each aliquot was then mixed with the quantity of either propylene glycol, butanediol or trimethylolpropane shown in Table I. All solutions (except those in Examples VII and VIII) were then spray dried in a Bowen three-foot, flat-bottom drier at an outlet temperature of 180° F. and a feed rate of about 80 ccs. per minute. The tabulated assay and test results for each dried solid are given in Table I. All products were soluble to the extent of at least 30 weight percent in methanol and ethanol.

EXAMPLES IX–XVI

A number of solutions were prepared in the same manner as Examples I–VIII, except that the reaction was allowed to proceed to completion as in Example I of our copending application Ser. No. 88,206, such that a higher Al/Br ratio would be attained. The resulting solutions were combined and subjected to refluxing at about 100 to 105° C. for two hours. After cooling, the combined solution assayed as follows: 11.3% aluminum, 16.3% bromine, and Al/Br ratio=2.0. The combined solution was then divided into 500 gram aliquots and each aliquot was then mixed with the quantity of either propylene glycol, butanediol, or trimethylolpropane shown in Table II. All aliquot solutions (except those in Examples XV and XVI) were then spray dried in a Bowen three-foot, flat-bottom drier at an outlet temperature of 180° F. and a feed rate of about 80 ccs. per minute. The tabulated assays and test results for the dried solids are given in Table II. All products were soluble to the extent of at least 30 weight percent in methanol and ethanol.

EXAMPLE XVII

A 200 gram aliquot of a basic aluminum bromide solution, prepared as in Examples I–VIII, was subjected to refluxing at about 100° C. for a 2-hour period. To the cooled solution was added 20.0 gram of propylene glycol. The homogeneous solution was dried to a solid in a rotating flask at a pressure of about 10 mm. Hg and a maximum temperature of about 40° C. The solids were rapidly soluble in anhydrous alcohol SDA-40 to the extent of at least 30% and had a compatibility of 314 cc. of $CCl_4$. The solids assayed 17.7% Al, 27.5% Br, 15.2% propylene glycol and 15.3% $H_2O$ by Karl Fischer.

TABLE I

| Example | Polyol | Wts. (g.) | Percent Al | Percent Br | Al/Br | Percent C | Polyol, calc. | $H_2O$, Karl Fischer | $H_2O$, calc. | Compatibility, cc. $CCl_4$ |
|---|---|---|---|---|---|---|---|---|---|---|
| I | Propylene glycol | 75.0 | 17.7 | 27.7 | 1.89 | 8.33 | [1] 17.6 | 11.7 | 9.4 | 355 |
| II | do | 50.0 | 18.3 | 28.8 | 1.87 | 6.16 | [1] 13.0 | 13.1 | 11.5 | 325 |
| III | 1,4-butanediol | 75.0 | 17.4 | 27.7 | 1.86 | | [2] 17.0 | 10.9 | | 245 |
| IV | do | 50.0 | 18.4 | 28.3 | 1.92 | | [2] 12.2 | 12.4 | | 240 |
| V | Trimethylolpropane | 50.0 | 18.1 | 27.6 | 1.94 | | [3] 16.0 | 12.5 | 10.1 | 256 |
| VI | do | 25.0 | 19.5 | 28.9 | 2.00 | | [3] 8.6 | 14.9 | 13.0 | 270 |
| VII [4] | 1,3-butanediol | 75.0 | 17.8 | 27.4 | 1.92 | 10.54 | [1] 19.8 | 9.5 | 5.2 | >400 |
| VIII [4] | do | 50.0 | 18.7 | 28.9 | 1.91 | 7.75 | [1] 14.5 | 11.4 | 8.5 | >400 |

[1] Calculation based on carbon assay.
[2] Calculation based on percent $H_2O$ determined by Karl Fischer titration. Hence, due to inconsistency of Karl Fischer values, these calculated polyol percentages are only approximations.
[3] Calculation based on Al assay of solution and added TMP—neither is volatile.
[4] Solutions dried in rotary vacuum dryer at ambient temperature and 10-15 mm. Hg pressure.

TABLE II

| Example | Polyol | Wts. (g.) | Percent Al | Percent Br | Al/Br | Percent C | Polyol, calc. | $H_2O$, Karl Fischer | $H_2O$, calc. | Compatibility, cc. $CCl_4$ |
|---|---|---|---|---|---|---|---|---|---|---|
| IX | Propylene glycol | 75.0 | 18.1 | 27.1 | 1.98 | 8.38 | [1] 17.7 | 11.1 | 8.7 | 285 |
| X | do | 50.0 | 19.2 | 28.3 | 2.01 | 6.30 | [1] 13.3 | 12.3 | 9.0 | 255 |
| XI | 1,4-butanediol | 75.0 | 17.8 | 26.3 | 2.01 | | [2] 17.1 | 10.8 | | 190 |
| XII | do | 50.0 | 18.5 | 27.5 | 1.99 | | [2] 12.3 | 12.6 | | 190 |
| XIII | Trimethylolpropane | 50.0 | 18.5 | 27.9 | 1.97 | | [3] 16.0 | 12.3 | 8.6 | 205 |
| XIV | do | 25.0 | 20.1 | 29.1 | 2.05 | | [3] 8.6 | 14.6 | 10.4 | 210 |
| XV [4] | 1,3-butanediol | 75.0 | 18.5 | 26.9 | 2.04 | 10.59 | [1] 18.9 | 9.8 | 6.5 | 320 |
| XVI [4] | do | 50.0 | 18.6 | 28.7 | 1.93 | 8.11 | [1] 15.2 | 10.9 | 8.5 | 375 |

[1] Calculation based on carbon assay.
[2] Calculation based on percent $H_2O$ determined by Karl Fischer titration. Hence, due to inconsistency of Karl Fischer values, these calculated polyol percentages are only approximations.
[3] Calculations based on Al assay of solution and added TMP—neither is volatile.
[4] Solutions dried in rotary vacuum dryer at ambient temperatures and 10-15 mm. Hg pressure.

EXAMPLE XVIII

A sample was prepared similarly to XVII except that 10.0 grams of propylene glycol was added before drying. The product was rapidly soluble in anhydrous SCDA-40 to the extent of at least 30% and had a compatibility of 295 cc. of $CCl_4$. The product assayed 19.6% Al, 30.2% Br, 8.5% propylene glycol and 14.5% $H_2O$ by Karl Fischer.

The complexes of the present invention are useful in antiperspirant and other cosmetic applications, and particularly aerosol antiperspirant sprays. Such aerosol antiperspirant formulations comprise a non-toxic dermatologically acceptable non-aqueous solvent, such as anhydrous ethanol, and about 40 to 60 weight percent of a fluorocarbon propellant such as Freon-12, Freon-114, Freon-22, Freon-113, etc. The basic aluminum bromide-polyol complex should be present to the extent of at least 5 weight percent of the total aerosol formulation. Since the volatile propellants are dissipated immediately upon application, this will yield a concentration of at least 10 weight percent based on the non-aqueous solvent.

Due to the high carbon tetrachloride compatibilities of the complexes of the present invention, much higher concentrations of the active ingredient (aluminum compound) may be used in the aerosol formulations than has previously been possible. In addition, due to the low polyol content, antiperspirant compositions using the complexes of the present invention have better drying characteristics.

As examples of aerosol antiperspirant formulations, three batches were prepared using the 1,3-butanediol complexes of basic aluminum bromide described in Example VIII above. The three batches are listed as Examples XIX, XX and XXI in Table III below.

TABLE III

| Component of formulation examples | Weight percents of each component | | |
|---|---|---|---|
| | XIX | XX | XXI |
| Polyol complex (from Ex. VIII) | 15.0 | 12.0 | 9.0 |
| Stearic acid | 1.0 | 1.0 | |
| Hexadecyl alcohol | 1.0 | 2.0 | 2.0 |
| Silicone Fluid 1066 (General Electric) | | 1.0 | 2.0 |
| Isopropyl myristate | | | 2.0 |
| SDA-40 alcohol | 33.0 | 34.0 | 35.0 |
| Dichlorotetrafluoroethane | 30.0 | 30.0 | 30.0 |
| Dichlorodifluoromethane | 20.0 | 20.0 | 20.0 |

The products of all three examples shown in Table III exhibited good spraying characteristics and after one week showed no gelation tendencies at either ambient or 40° F.

The present invention may be embodied in other specific forms without departing from the spirit or essential attributes thereof and, accordingly, reference should be made to the appended claims, rather than to the foregoing specification as indicating the scope of the invention.

We claim:

1. A basic aluminum bromide complex solid formed by heating an aqeous solution of an approximately 5/6 basic aluminum bromide under reflux conditions; adding a polyhydroxy compound, having at least two carbon atoms of said compound linked to hydroxy groups, to said solution to form a mixture; and drying said mixture to a substantially friable solid which is said complex; said complex solid having a water content of greater than 10 weight percent up to about 17 weight percent determined by Karl Fischer analysis and having a polyhydroxy compound content of about 5 to 18 weight percent.

2. A basic aluminum bromide-complex solid according to claim 1 wherein said approximately 5/6 basic aluminum bromide has the general empirical formula:

$$Al_2(OH)_xBr_y$$

wherein $x=4.5$ to $5.1$ and $y=0.9$ to $1.2$, such that $x+y=6$.

3. A basic aluminum bromide complex solid according to claim 1 wherein said polyhydroxy compound is selected from the group consisting of propylene glycol; 1,3-butanediol; 1,4-butanediol and trimethylolpropane.

4. A basic aluminum bromide complex solid according to claim 1 having a halohydrocarbon compatibility of at least 190 ccs. of $CCl_4$ when admixed with 60 grams of a 30 weight percent solution of said complex in SDA-40 alcohol, before a permanent cloudiness occurs.

5. A basic aluminum bromide complex solid according to claim 1 formed by heating said aqueous solution under reflux conditions for about 2 to 4 hours at a temperature of about 90 to 110° C.

6. A basic aluminum bromide complex solid according to claim 1 formed by vacuum drying said mixture at a maximum temperature of about 40° C.

7. A basic aluminum bromide complex solid according to claim 1 formed by spray drying said mixture.

8. A basic aluminum bromide complex solid according to claim 1 formed by cooling said solution before adding the polyhydroxy compound.

References Cited

UNITED STATES PATENTS 3,420,932  1/1969  Jones et al. _____ 260—448 AD
3,359,169  12/1967  Slater _____ 260—448 AD X HELEN M. S. SNEED, Primary Examiner U.S. Cl. X.R.

260—448 AD; 424—47